US009462638B2

(12) United States Patent
Lee et al.

(10) Patent No.: US 9,462,638 B2
(45) Date of Patent: Oct. 4, 2016

(54) INDUCTION HEATING COOKER AND CONTROL METHOD THEREOF

(71) Applicant: SAMSUNG ELECTRONICS CO., LTD., Suwon (KR)

(72) Inventors: Se Min Lee, Yongin (KR); Kil Young Lee, Hwaseong (KR); Seong Deog Jang, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 450 days.

(21) Appl. No.: 13/950,801

(22) Filed: Jul. 25, 2013

(65) Prior Publication Data

US 2014/0027443 A1 Jan. 30, 2014

(30) Foreign Application Priority Data

Jul. 27, 2012 (KR) ........................ 10-2012-0082308

(51) Int. Cl.

*H05B 6/12* (2006.01)
*H05B 6/06* (2006.01)
*H02M 1/42* (2007.01)

(52) U.S. Cl.

CPC ................ *H05B 6/06* (2013.01); *H05B 6/062* (2013.01); *H05B 2213/04* (2013.01)

(58) Field of Classification Search

CPC ..... H05B 6/062; H05B 6/06; H05B 2213/04
USPC ............... 219/620, 626, 660, 663, 665, 662; 363/78, 98, 124, 126
See application file for complete search history.

(56) References Cited

U.S. PATENT DOCUMENTS

| | | | | |
|---|---|---|---|---|
| 7,692,121 B2 * | 4/2010 | Pinilla | H05B 6/06 219/443.1 |
| 2006/0086728 A1 * | 4/2006 | Kim | H05B 6/062 219/626 |
| 2008/0049470 A1 * | 2/2008 | Ishio | H05B 6/08 363/78 |

FOREIGN PATENT DOCUMENTS

| | | |
|---|---|---|
| EP | 1 420 613 | 5/2004 |
| EP | 2 410 814 | 1/2012 |
| JP | 7-254483 | 10/1995 |
| JP | 2011-150796 | 8/2011 |

OTHER PUBLICATIONS

European Search Report issue Oct. 31, 2013 in corresponding European Application No. 13177013.3.

* cited by examiner

*Primary Examiner* — Quang Van
(74) *Attorney, Agent, or Firm* — Staas & Halsey LLP

(57) ABSTRACT

An induction heating cooker having an oil temperature control function by of the amount of change of an operating frequency, and a control method thereof, the induction heating cooker including a heating coil, an inverter unit, a driving unit, a detection unit to detect a value of a current that flows at the heating coil, and a control unit to calculate an operating frequency of the driving unit according to the value of the current, to vary the operating frequency so that the heating coil maintains a constant output that corresponds to an output level, and to determine whether oil accommodated in a container placed on the heating coil is overheated, by use of an amount of change of the operating frequency, and the maintenance or the control of the temperature of oil may be achieved.

20 Claims, 10 Drawing Sheets

INDUCTION HEATING COOKER AND CONTROL METHOD THEREOF

CROSS-REFERENCE TO RELATED APPLICATIONS

This application claims the benefit of the Korean Patent Application No. 10-2012-0082308, filed on Jul. 27, 2012, in the Korean Intellectual Property Office, the disclosure of which is incorporated herein by reference.

BACKGROUND

1. Field

Embodiments of the present disclosure relate to an induction heating cooker having an oil temperature control function by using the amount of change of an operating frequency, and a control method thereof.

2. Description of the Related Art

An induction heating cooker is an apparatus in which a high frequency strong magnetic field is generated by supplying a high-frequency current to heating coils such that an eddy current is generated at a cooking container (hereinafter called a "container") magnetically coupled to the heating coils through the magnetic field, thereby allowing the container to generate heat by the Joule's heat generated by the eddy current and thus cooking food.

The induction heating cooker as such is provided with a plurality of heating coils, which is configured to provide a heat source to an inside a body that forms an exterior appearance of the induction heating cooker, fixedly installed thereto. In addition, at an upper portion of the body, a cooking plate is provided so that the container may be placed thereon.

On the cooking plate, cooking zones are defined at the positions corresponding to the heating coils, and the cooking zones as such are configured to perform a role to guide the position on which the container is needed to be placed when a user intends to cook food.

When a user intends to cook food by using oil, in a case when the container provided with the oil therein is placed on the cooking plate and when the state of the container being placed on the cooking plate is maintained for a long period of time by the inattentiveness of the user after a heating is started, the oil may be overheated, and thus the output of the heating coil is needed to be adjusted.

Referring to FIG. 1, a cooking apparatus configured to control the output of the heating coil by detecting the temperature of oil is illustrated.

The control of an output configured to prevent oil from being ignited as a result of an overheating is performed by indirectly detecting the temperature of the oil (not shown) accommodated in the container 'C' by use of a temperature sensor 'S' positioned at a lower end of the cooking plate 2.

However, in the case of the related technology, directly detecting the temperature of the container C by use of the temperature sensor S is difficult.

That is, in the case of the related technology, the temperature sensor S is configured to detect the value of the temperature of the oil being transmitted to the bottom of the container C and the cooking plate 2.

Thus, with respect to the related technology, the difference in the detected temperature is occurred depending on the gaps among the bottom of the container C, the cooking plate 2, and the temperature sensor S.

In addition, with respect to the related technology, since the temperature of the oil passes through an intermediate medium several times, the actual temperature of the oil is difficult to be measured in a precise manner.

SUMMARY

Therefore, it is an aspect of the present disclosure to provide an induction heating cooker configured to detect an overheating of oil, which is being heated, by use of an operating frequency of a driving unit configured to provide a signal to control the driving of an inverter unit, and a control method thereof.

It is another aspect to provide an induction heating cooker configured to adjust the output level of a heating coil after detecting an overheating of oil, and a control method thereof.

Additional aspects of the disclosure will be set forth in part in the description which follows and, in part, will be obvious from the description, or may be learned by practice of the disclosure.

In accordance with one aspect, an induction heating cooker includes a heating coil, an inverter unit, a driving unit, a detection unit and a control unit. The inverter unit may be configured to supply high-frequency power to the heating coil. The driving unit may be configured to provide a signal configured to control an operation of the inverter unit. The detection unit may be configured to detect a value of a current that flows at the heating coil. The control unit may be to calculate an operating frequency of the driving unit according to the value of the current, vary the operating frequency so that the heating coil maintains a constant output that corresponds to an output level, and determine whether oil accommodated in a container placed on the heating coil is overheated, by use of an amount of change of the operating frequency.

The amount of change of the operating frequency may be a value that corresponds to a difference between an initial operating frequency corresponding to the output level and a varied operating frequency upon elapse of a certain time period after a change to the output level.

The control unit, in a case when an output of the heating coil is below an output that corresponds to the output level, may be configured to decrease the operating frequency of the driving unit such that the output of the heating coil is maintained at a same level as the output that corresponds to the output level.

The control unit, in a case when the amount of change of the operating frequency is below a predetermined first reference value during a certain period of time, may be configured to determine that the oil accommodated in the container is not overheated.

The control unit, in a case when the amount of change of the operating frequency is equal to or above a predetermined first reference value during a certain period of time, may be configured to determine that the oil accommodated in the container is overheated.

The predetermined first reference value may be a value that corresponds to an amount of change of the operating frequency, which serves as reference in changing the output level of the heating coil as the oil is overheated in temperature.

The control unit may be configured to send a control signal to the driving unit to maintain the output level of the heating coil if determined that the oil is not overheated.

The control unit may be configured to send a control signal to the driving unit to decrease the output level of the heating coil if determined that the oil is overheated.

The control unit may be configured to stop the driving of the heating coil in a case when the oil accommodated in the container is determined to be overheated while the output level of the heating coil corresponds to a minimum output level.

The induction heating cooker may further include a manipulation unit having an oil temperature controlling button configured to select an oil temperature control function, wherein the control unit may be configured to supply high-frequency power to the heating coil when an oil temperature control function selection signal is input by a manipulation of the oil temperature controlling button.

The induction heating cooker may further include a display unit that may be configured to display the output level of the heating coil and information on oil temperature.

In accordance with one aspect, a method of controlling an induction heating cooker having a heating coil, an inverter unit to supply high-frequency power to the heating coil, a driving unit to provide a signal configured to control an operation of the inverter unit, and a detection unit to detect a value of a current that flows at the heating coil includes detecting the value of the current that flows at the heating coil, calculating an operating frequency of the driving unit according to the value of the current, varying the operating frequency to maintain a constant output that corresponds to an output level, calculating an amount of change of the operating frequency at certain time intervals, and determining whether oil, which is accommodated in a container that is placed on the heating coil, is overheated by use of the amount of change of the calculated operating frequency.

The amount of change of the operating frequency may be a value that corresponds to a difference between an initial operating frequency corresponding to the output level and a varied operating frequency upon elapse of a certain time period after a change to the output level.

In the varying of the operating frequency, in a case when an output of the heating coil is below an output that corresponds to the output level, the operating frequency of the driving unit may be decreased to maintain an output of the heating coil at a same level as an output that corresponds to the output level.

In the determining of whether oil is overheated, in a case when the amount of change of the operating frequency is below a predetermined first reference value during a certain period of time, the oil accommodated in the container may be determined as not being overheated.

In the determining of whether oil is overheated, in a case when the amount of change of the operating frequency is equal to or above a predetermined first reference value during a certain period of time, the oil accommodated in the container may be determined as being overheated.

The predetermined first reference value may be a value that corresponds to the amount of change of the operating frequency, which serves as a reference in changing the output level of the heating coil as the oil is overheated in temperature.

The method may further include maintaining the output level of the heating coil by sending a control signal to the driving unit, if determined that the oil is not overheated.

The method may further include decreasing the output level of the heating coil by sending a control signal to the driving unit, if determined that the oil is overheated.

The method may further include stopping the operation of the heating coil, in a case when the output level of the heating coil corresponds to a minimum output level.

The method may further include supplying high-frequency power to the heating coil, when an oil temperature control function selection signal is input.

The method may further include displaying the output level of the heating coil and information on oil temperature.

BRIEF DESCRIPTION OF THE DRAWINGS

These and/or other aspects will become apparent and more readily appreciated from the following description of the embodiments, taken in conjunction with the accompanying drawings of which:

FIG. 3 is a control block diagram of the induction heating cooker in accordance with one embodiment of.

DETAILED DESCRIPTION

Figure 1:
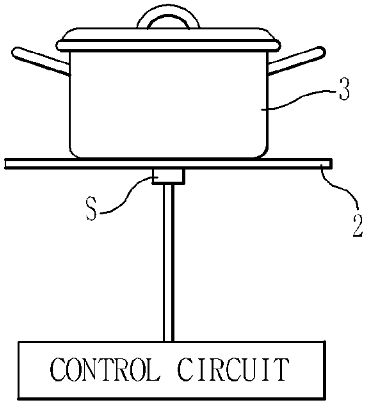
FIG. 1 (Related Art)
FIG. 1 is a drawing explaining a method of detecting the temperature of oil implemented on a related induction heating cooker.

Reference will now be made in detail to the embodiments, examples of which are illustrated in the accompanying drawings, wherein like reference numerals refer to like elements throughout.

First, in the present disclosure, for the convenience in providing descriptions and statements, the statement referring to the "output level (of a heating coil)," in addition to referring to "output level of a heating coil (ex: level 1 or level 15)" that is set by a user, is presupposed to refer to "output power that corresponds to the output level of the heating coil."

For example, assuming that the output power that corresponds to output level 5 is about 600 W, the statement in "operating at the output level 5" may be referred to as in "operating at about 600 W, which is the output power that corresponds to the output level 5."

Figure 2:
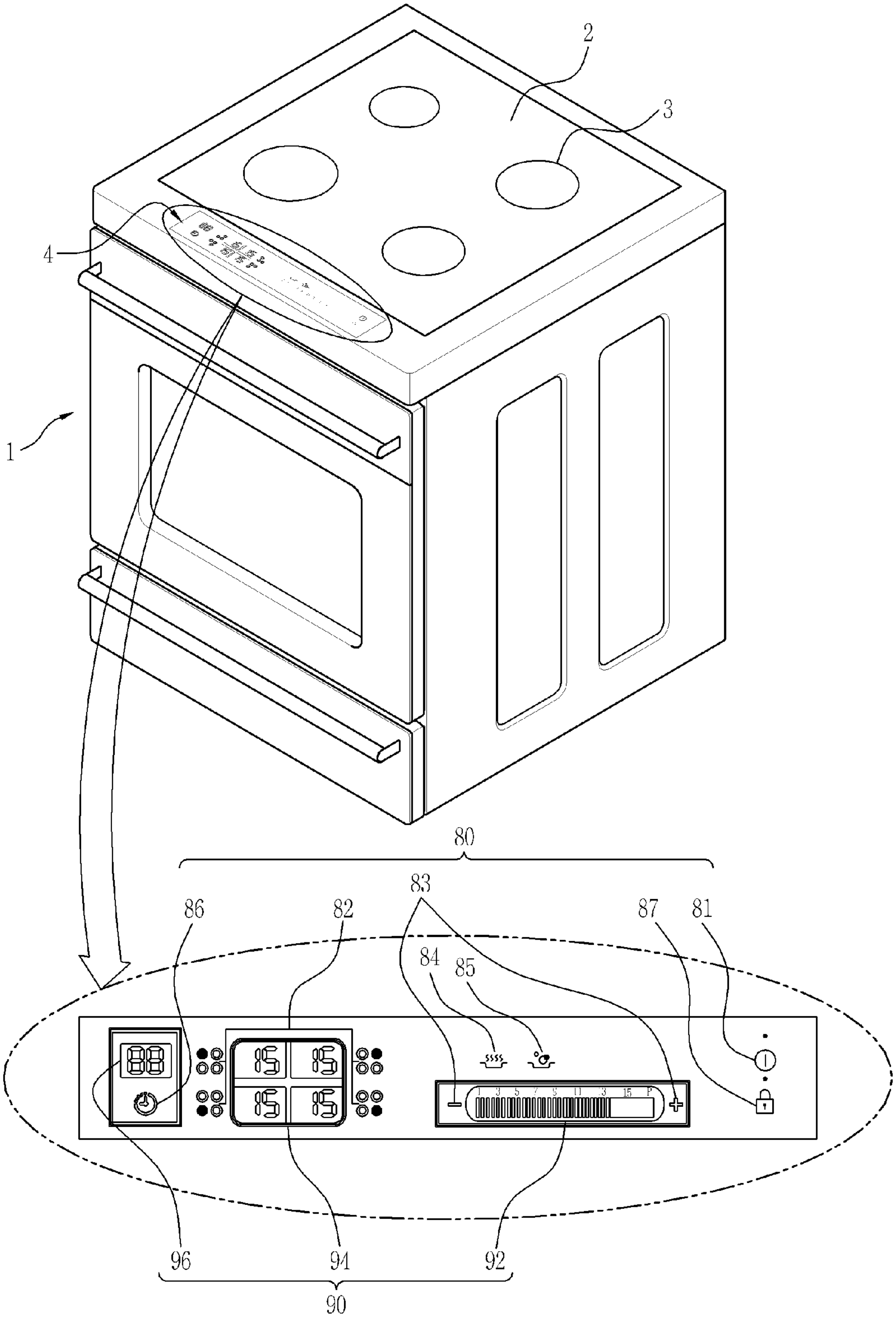
FIG. 2 is a perspective view showing an exterior appearance of an induction heating cooker in accordance with one embodiment.

FIG. 2 is a perspective view showing an exterior appearance of an induction heating cooker in accordance with one embodiment.

Referring to FIG. 2, the induction heating cooker in accordance with one embodiment is provided with a body 1.

At an upper portion of the body 1, a cooking plate 2 formed in the shape of a flat panel is installed so that a container C may be placed thereon.

The cooking plate 2 may be formed of tempered-glass material such as ceramic glass as to prevent the cooking plate 2 from being easily broken or scratched.

On the cooking plate 2, cooking zones 3 configured to guide the position on which the container C is needed to be placed to cook food are defined.

At an inside the body 1, a plurality of heating coils L (refer to FIG. 3) installed at a lower portion of the cooking plate 2 to provide heat sources to the cooking plate 2 is provided.

The heating coils L as such each is disposed at a position corresponding to the each of the cooking zones 3 of the cooking plate 2 (one unit of the heating coils is disposed per one unit of the cooking zone).

On FIG. 2, the induction heating cooker having four units of the cooking zones 3 is illustrated as an example, but the number of the cooking zones may be variably changed.

In addition, at an upper portion of the body 1, a control panel 4 including a manipulation unit 80 composed of a plurality of manipulation buttons configured to input various commands with regard to a cooking operation, as well as a display unit 90 configured to display information with regard to an operation of the induction heating cooker, is provided.

Here, the manipulation unit 80 includes a number of buttons such as an ON/OFF button 81 configured to turn ON/Off the power, a cooking zone selection button 82 configured to select the cooking zone 3 at which a cooking operation is needed to be performed, a +/− button 83 configured to set an output level of the heating coils L or to set a cooking time, a keep-warm button 84 configured to select a temperature maintenance function to maintain the temperature at a constant level (ex: between 60° C. and 70° C.) as to prevent the cooked food from turning cold, an oil temperature controlling button 85 configured to select an oil temperature control function that may be used when to apply heat at the container accommodating oil, a timer button 86 configured to select a safety shutoff function to stop a cooking operation when a predetermined time set by a user is expired, and a lock button 87 configured to select a lock function to prevent a button manipulation by a child in a state when a cooking operation is not being performed or to prevent a manipulation of other buttons other than the ON/OFF button 81 in a state when a cooking operation is being performed.

In addition, the display unit 90 includes a first display window 92 configured to display an output level of the heating coil L that is set by a user through the +/− button 83, a second display window 94 configured to display the output levels of the respective heating coil L, which are set with respect to the cooking zones 3, and the residual heat after the completion of a cooking operation, and a third display window 96 configured to display a setting of a lock function (the setting of a lock function is displayed in a letter "L") and a cooking time that is set through the +/− button 83.

Here, the output level of the heating coil L that may be set through the +/− button 83 includes a level from the level 1 to the level 15, as well as an output level 'P' according to a selection of a power boost function (a function configured to cook food in a rapid manner by generating a large output within a short period of time).

Hereinafter, a "maximum output level" is referred to as the "output level P according to the selection of the power boost function.

Figure 3:
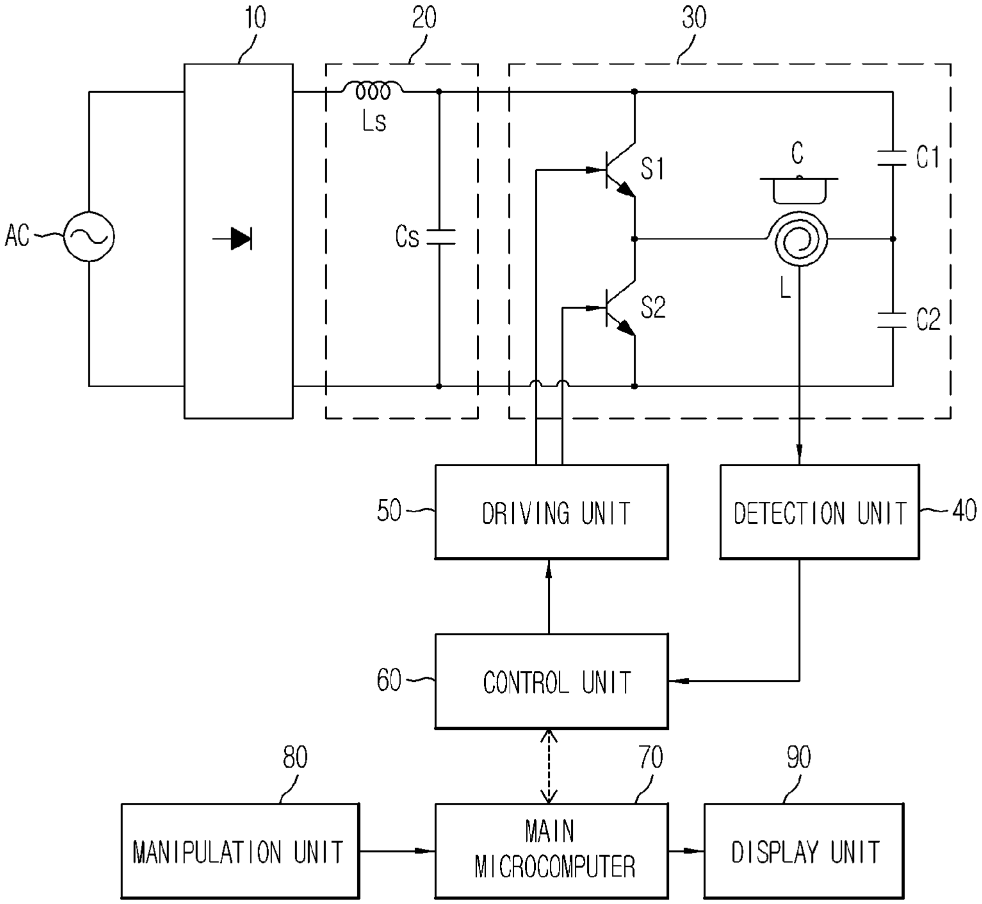

FIG. 3 is a control block diagram of the induction heating cooker in accordance with one embodiment.

Although an induction heating cooker having four units of the cooking zones 3 is illustrated on FIG. 2 as an example, such that fewer or more cooking zones 3 can be provided. Furthermore, since the control components configured to operate each of the heating coils L arranged with respect to each of the cooking zones 3 are same to the respective heating coils, for the convenience of the description, on FIG. 3, the control components configured to operate a single unit of the heating coils L is illustrated.

Hereinafter, the components configured to control a cooking operation, which is performed at the one cooking zone 3 from the four units of the cooking zones 3 illustrated on FIG. 2, will be described in detail, and the descriptions of the components configured to control the cooking operations being performed at the remaining three units of the cooking zones 3 will be omitted.

Referring to FIG. 3, the induction heating cooker in accordance with one embodiment of the present disclosure is provided with a rectifying unit 10, a smoothing unit 20, an inverter unit 30, a detection unit 40, a driving unit 50, a control unit 60, a main microcomputer 70, the manipulation unit 80, and the display unit 90.

The rectifying unit 10 rectifies an alternating current (AC), which is input, and outputs a ripple voltage, which is rectified.

The smoothing unit 20 is configured to smoothen the ripple voltage, which is provided from the rectifying unit 10, and to output a constant DC voltage, which is obtained by smoothing the ripple voltage.

The inverter unit 30 includes switching devices S1 and S2 configured to provide resonance voltage by switching the DC voltage being provided from the smoothing unit 20 according to a switching control signal of the driving unit 50, and resonance capacitors C1 and C2 serially connected in between a positive supply terminal and a negative supply terminal to consecutively resonate with respect to the heating coils L by the voltage being input.

The heating coils L is connected in between the switching devices S1 and S2 to apply heat at the container C by inducing eddy current at the container C through the resonance voltage being input from the rectifying unit 10.

In a case when the switching device S1 is conducted while the switching device S2 is shut off, the heating coils L and the resonance capacitor C1 serially form a resonance circuit. Meanwhile, in a case when the switching device S2 is conducted while the switching device S1 is shut off, the heating coil L and the resonance capacitor C2 serially form a resonance circuit.

The detection unit 40 detects the value of the current, that is, the value of the output current, which flows at the heating coil L, and provides the detected value of the current to the control unit 60.

For example, as for the detection unit 40, a current transformer sensor (a CT sensor) may be used.

The driving unit 50 turns ON/OFF the switching devices S1 and S2 by outputting a driving signal to the switching devices S1 and S2 of the inverter unit 30 according to the control signal of the control unit 60.

The control unit 60 controls the driving of the heating coil L by sending a control signal to the driving unit 50 according to the control signal of the main microcomputer 70.

The control unit 60, when a control signal to start a cooking is input from the main microcomputer 70, alternately generates a switching control signal configured to operate only one of the switching devices S1 and S2 through the driving unit 50.

When the switching device S1 is conducted while the switching device S2 is shut off, a circuit composed of the switching device S1, the heating coil L, and the resonance capacitor C1 is formed.

Meanwhile, when the switching device S2 is conducted while the switching device S1 is shut off, a circuit composed of the resonance capacitor C2, the heating coil L, and the switching device S2 is formed, and resonance voltage is provided to the heating coils L.

At this time, since the heating coil L is consecutively reached a resonance state with the resonance capacitors C1 and C2, a large resonance current flows at the heating coil L.

By the resonance current, at the heating coil L, a high-frequency magnetic field is generated, and an eddy current is induced by the electromagnetic induction caused by the high-frequency magnetic field, so that the container C is heated by the eddy current at the container C, and thus the food in the container C is heated as a desired cooking is proceeded.

The control unit 60 performs an oil temperature control function according to the control signal of the main micro computer 70.

The control unit 60 calculates an operating frequency of the driving unit while receiving the value of the current, that is, the value of an output current flowing at the heating coil L from the detection unit 40.

In addition, the control unit 60 compensates for the output of the heating coil. That is, while the oil in the container C is being heated, the control unit 60 varies the operating frequency of the driving unit 50 that provides a driving signal configured to control an operation of the inverter unit 40 as to maintain the output level of the heating coil L at a constant output level.

For example, when the output of the heating coil L is decreased as the container C is heated, the control unit 60 may be able to increase the output of the heating coil L by decreasing an operating frequency, so that the heating coil may be able to maintain a constant output that corresponds to an output level.

In addition, the control unit 60 calculates the amount of change of the operating frequency of the driving unit 50 at a certain time interval T from the point in time when a cooking operation is started after the container C is placed on the cooking zone 3.

The amount of change of the operating frequency is a value that corresponds to a difference between an operating frequency corresponding to the output level and a varied operating frequency upon elapse of a certain time period after a change to the output level.

The control unit 60 determines that the oil accommodated in the container is not overheated in a case when the amount of change of the operating frequency of the driving unit 50 is below a predetermined first reference value during a certain period of time after a cooking operation is started.

Here, an overheating, in a case when the magnetic field generated at the heating coils L is weakened as the temperature of the bottom surface of the container C is increased above a predetermined reference temperature, is referred to as a state when the amount of change of the operating frequency provided to compensate for the weakening as such is increased above the predetermined first reference value.

Here, the first reference value is referred to as the amount of change of the operating frequency, which serves as a reference in changing the output level of the heating coil, as the oil is overheated in temperature.

The first reference value may be determined by considering a value that corresponds to the amount of change of the operating frequency in a state when the temperature of the oil is no longer increased during a certain period of time.

The control unit 60 maintains the output level of the heating coil by sending a control signal to the driving unit, if determined that the oil is not overheated.

In addition, the control unit 60 determines that the oil accommodated in the container is overheated if the amount of change of the operating frequency of the driving unit 50 is above the predetermined first reference value during a certain period of time.

The control unit 60 decreases the output level of the heating coil by sending a control signal to the driving unit if determined that the oil is overheated.

At this time, the control unit 60 may be able to stop the driving of the heating coil in a case when the output level of the heating coil corresponds to a minimum output level, for example, in a case when an output level is about "1."

The control unit 60 includes a memory (not shown) at an inside thereof. At the memory (not shown), the first reference value to determine whether the temperature of the oil accommodated in the container C is maintained at a constant state, as well as a certain time interval Tat which the operating frequency of the driving unit 40 is checked, is stored.

The main microcomputer 70 controls an overall operation of the induction heating cooker. The main micro computer 70 is communicatively connected to the control unit 60, which controls the driving of the heating coil L, and by sending a control signal to the control unit 60, enables the control unit 60 to control the driving of the heating coil L.

The main microcomputer 70 sends a control signal to the control unit 60 when a selection signal of an oil temperature control function is input through the manipulation unit 80 to control such that the control unit 60 performs the oil temperature control function.

The manipulation unit 80 includes a plurality of manipulation buttons at an upper portion of the body, so that a user may be able to input the commands related to a cooking operation, such as the ON/OFF of power or the oil temperature control function.

The display unit 90, according to the control signal of the main microcomputer 70, displays the operation status of the induction heating cooker, the output level of the heating coils L that a user inputs through the +/− button 83, the temperature information of oil, and the cooking time.

Figure 4A:
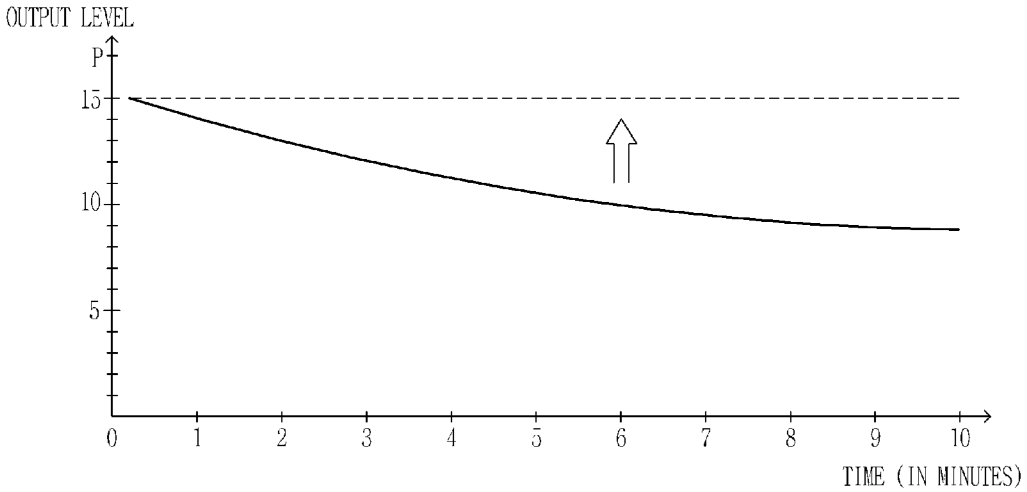
FIG. 4A is a drawing explaining the decrease of an output of heating coils when the temperature of the bottom of a container is increased in accordance with one embodiment.
Figure 4B:
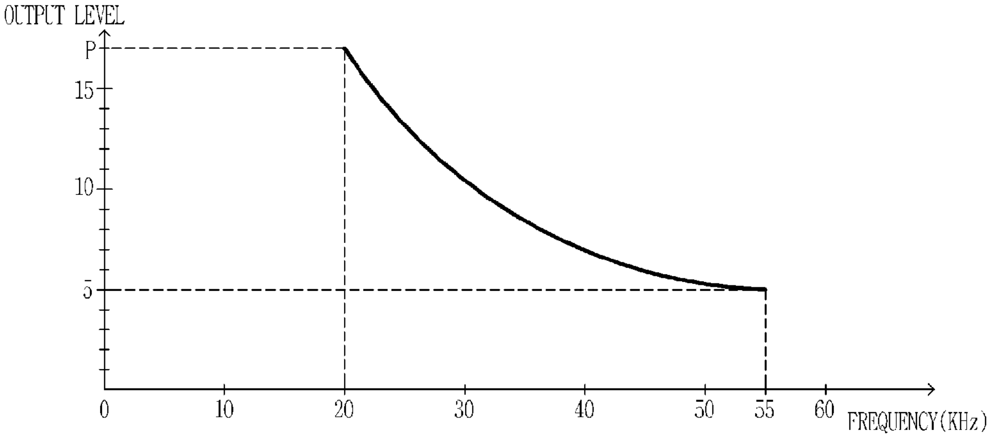
FIG. 4B is a drawing explaining the correlation between the operating frequency of a driving unit and the output level of the heating coils in accordance with one embodiment.

FIG. 4A is a drawing explaining the decrease of an output of the heating coil when the temperature of the bottom of the container is increased in accordance with one embodiment, and FIG. 4B is a drawing explaining the correlation between the operating frequency of the driving unit and the output level of the heating coils in accordance with one embodiment.

Referring to FIG. 4A, as a cooking operation is being proceeded, that is, as time is proceeded, the temperature of the bottom surface of the container C is increased so that the magnetic field that performs an induction heating is weakened.

Thus, since the magnetic field generated at the heating coil L is weakened, the output level of the heating coil L is decreased.

Here, the occurrence and the degree of the decrease of the output level of the heating coil L may be determined by using the value of the current, that is, the value of the output current, that flows at the heating coil L, and the value of the output current is detected through the detection unit 40 and provided to the control unit 60.

As illustrated on FIG. 4A, the control unit 60 varies the operating frequency (hereinafter, the statement referring to the "operating frequency" refers to the operating frequency of the driving unit 50) of the driving unit 50 configured to provide the driving signal to control an operation of the inverter unit 40 such that the constant output level at "15" is maintained (refer to the direction of the arrow on FIG. 4A), thereby heating the oil in the container C.

Referring to FIG. 4B, the lower the operating frequency of the driving unit 50 is, the higher the output level of the heating coil L is, and the higher the operating frequency of the driving unit 50 is, the lower the output level of the heating coil L is.

Thus, the control unit 60 decreases the operating frequency of the driving unit 50 as to maintain the output level of the heating coil L at the constant level of the output level at about "15."

Since the control unit 60 maintains the output level of the heating coil at a constant level, the temperature of the bottom surface of the container C continues to increase, and as the temperature of the bottom surface of the container C continues to increase, the operating frequency of the driving unit 50 continues to decrease.

The control unit 60 may be able to calculate the amount of change of the operating frequency, as the operating frequency continues to decrease.

In addition, the control unit 60 may be able to determine whether the oil which is accommodated in the container C placed on the heating coil is overheated, by using the amount of change of the operating frequency.

With reference to the above, the detailed descriptions will be provided by referring to FIGS. 5A to 5D.

Figure 5A:
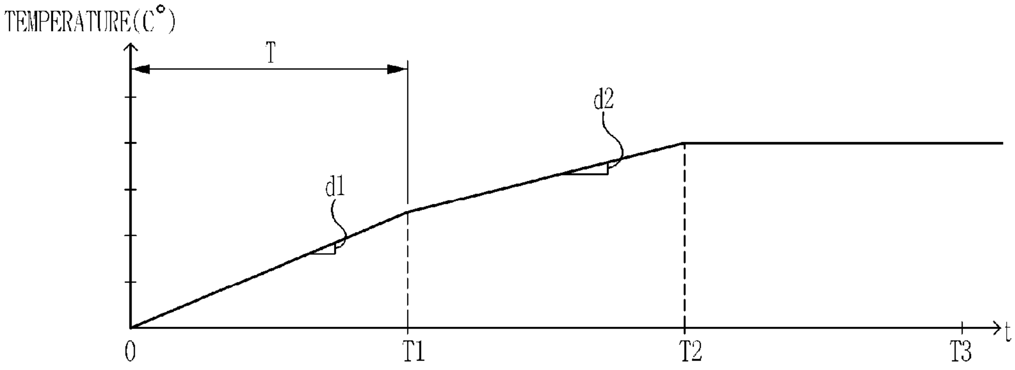
FIG. 5A is a drawing explaining the temperature change of oil according to the elapsing of time in accordance with one embodiment.
Figure 5B:
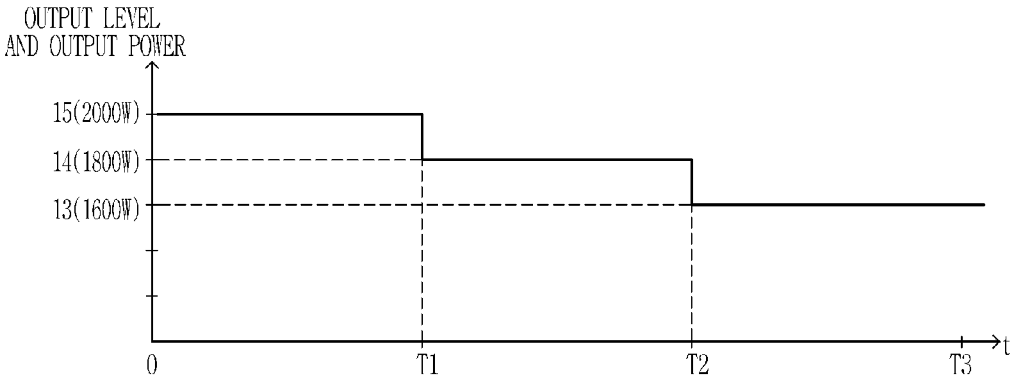
FIG. 5B is a drawing explaining the changing of an output level in accordance with one embodiment.
Figure 5C:
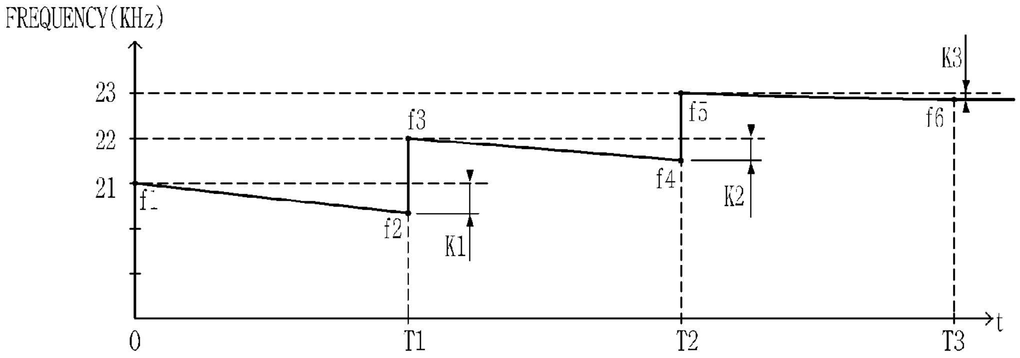
FIG. 5C is a drawing explaining the varying of the operating frequency for the heating coils to maintain a constant output that corresponds to the output level in accordance with one embodiment.
Figure 5D:
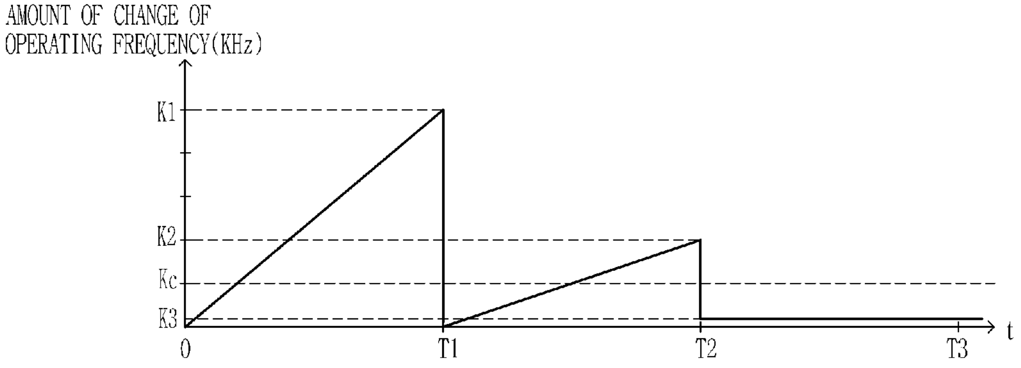
FIG. 5D is a drawing explaining the amount of change of the operating frequency in accordance with one embodiment.

FIG. 5A is a drawing explaining the temperature change of oil according to the elapsing of time in accordance with one embodiment, FIG. 5B is a drawing explaining the changing of an output level in accordance with one embodiment, FIG. 5C is a drawing explaining the varying of an operating frequency for the heating coil to maintain a constant output that corresponds to the output level in accordance with one embodiment, and FIG. 5D is a drawing explaining the amount of change of the operating frequency in accordance with one embodiment.

Hereinafter, by referring to FIGS. 2 to 5D, a method of controlling the temperature of the oil accommodated in the container C at a constant level while a cooking operation is being performed at the induction heating cooker in accordance with the embodiment will be described.

In addition, hereinafter, the descriptions will be provided on the assumption that the output power corresponding to the output level 13 is about 1600 W, the output power corresponding to the output level 14 is about 1800 W, and the output power corresponding to the output level 15 is about 2000 W. The output power that corresponds to each output level is not limited hereto, and may be changed.

In addition, hereinafter, the descriptions will be provided on the assumption that the operating frequency corresponding to the output level 13 is about 23 KHz, the operating frequency corresponding to the output level 14 is about 22 KHz, and the operating frequency corresponding to the output level 15 is about 21 KHz. The operating frequency that corresponds to each output level is not limited hereto, and may be changed.

In addition, the descriptions will be provided on the assumption that an initially desired output level of "15" is input.

The operation of the induction heating cooker during a first period (0~T1) is as follows.

Referring to FIG. 5A, the temperature of the oil accommodated in the container C in the increase is seen as the container C is heated.

When a user places the container C having oil therein on one cooking zone 3 among the four of the cooking zones 3, and then, after the cooking zone selection button 82 and the oil temperature controlling button 85 are manipulated, a desired output level is input through the +/− button 83, the main micro computer 70, by sending a control signal to the control unit 60, enables the control unit 60 to perform an oil temperature control function.

The control unit 60 sends a control signal to the driving unit 50 in order to perform an oil temperature control function according to the control signal of the main microcomputer 70, so that the resonance voltage may be supplied to the heating coil L.

At this time, since the heating coil L is consecutively reached a resonance state with the resonance capacitors C1 and C2, a large resonance current flows at the heating coil L.

By the resonance current, at the heating coil L, a high-frequency magnetic field is generated, and the container C is heated as an eddy current is induced at the container C by the electromagnetic induction caused by the high-frequency magnetic field, and thus the oil accommodate in the container C is heated.

As a result of the above, as the oil is heated, the temperature of the oil is increased.

As illustrated on FIG. 5A, since the initially desired output level of "15" is input, the temperature of the oil is continuously increased at a temperature increasing rate that corresponds to the output level of "15."

However, the value of the increasing rate of the temperature d1 is not fixed, but may be changed.

Referring to FIG. 5B, since the initially desired output level is set to "15", the control unit 60 sets the operating frequency at about 21 KHz (f1 in FIG. 5C) so that the output power of about 2000 W may be generated at t=0.

As a cooking operation is proceeded, that is, as time is proceeded, the temperature of the bottom surface of the container C is increased, and thus the magnetic field being generated at the heating coil L is weakened, and due to the above, the output level of the heating coil L is decreased.

However, the control unit 60 changes the operating frequency so that the output of the heating coil L may be maintained at a constant output level (here, at "15").

For example, the control unit 60 may decrease the operating frequency as to increase the output of the heating coil L, and may increase the operating frequency as to decrease the output of the heating coil L.

As a result of the above, the output level of the heating coil L may be maintained at a constant value.

The temperature of the oil in the container C is continuously increased.

When the temperature of the oil is continuously increased, the temperature of the bottom of the container C is also continuously increased, and thus, while a certain time interval T is being elapsed, the amount of change of the operating frequency is also continuously increased.

Referring to FIG. 5C, the operating frequency at t=0 is about 21 KHz f1, and as time is passed, the operating frequency continues to be decreased.

At t=T1, the operating frequency is a value f2 that is decreased by a certain value K1 from about 21 KHz.

The control unit 60 checks the operating frequency of the driving unit 50 at the time when the container C is placed on the cooking zone 3 and a cooking operation is started, that is, at t=0, and checks the operating frequency of the driving unit 50, that is, the operating frequency that is varied as the temperature of the bottom surface of the container C is increased, at a certain time interval T.

In addition, the control unit 60 calculates the amount of change of the operating frequency of the driving unit 50 at a certain time interval T starting from the point in time when the container C is placed on the cooking zone 3 and a cooking operation is started, that is, at 't=0'.

The amount of change of the operating frequency is a value that corresponds to a difference between an initial operating frequency f1 corresponding to an output level at a present point of time and a varied operating frequency f2 upon elapse of a certain time period T after a change to the output level.

The control unit 60 is configured to determine that the oil accommodated in the container is overheated in a case when the amount of change of the operating frequency at t=T1 is above a first reference value that is set in advance.

Here, the first reference value is referred to as the amount of change of the operating frequency, which serves as a reference in changing the output level of the heating coil, as the oil is overheated in temperature.

The first reference value may be determined by considering a value that corresponds to the amount of change of the operating frequency in a state when the temperature of the oil is no longer increased during a certain period of time.

The control unit 60, if determined that the oil accommodated in the container C is overheated, determines whether the current output level is a minimum output level, for example, in a case when an output level is about "1."

If the output level at the present point of time is not the minimum output level, the control unit 60 decreases the output level of the heating coil L by one level by sending a control signal to the driving unit 50.

Although the control unit 60 decreases the output level of the heating coil L by one level in the present embodiment, but the present disclosure is not limited hereto, and the control unit 60 may decrease the output level of the heating coil by more than two levels.

If the output level at the present point of time is the minimum output level, the control unit 60 may stop the operation of the heating coil L by sending a control signal to the driving unit 50.

Referring to FIG. 5D, the amount of change of the operating frequency according to the elapsing of time is shown.

At t=0, the amount of change of the operating frequency is provided with a value that is near "0".

The above value is referred to as a value of the amount of change of the frequency at the time when the heating coil L is started to be heated, in a case in which the initially desired output level of "15" is set.

Thus, during the initial period of a cooking operation, the state of the magnetic field generated at the heating coil L is not weakened, and accordingly, the amount of change of the operating frequency is provided with the value that is near "0".

However, as a cooking operation is operating, the temperature of the bottom surface of the container C is increased, and thus the magnetic field generated at the heating coil L is weakened, and because of the above, the output level of the heating coil L is decreased.

The control unit 60 continues to decrease the operating frequency as to compensate for the decreasing output level of the heating coil L.

As a result of the above, the amount of change of the operating frequency is increased as time is elapsed, and at t=T1, the amount of change K1 of the operating frequency is provided with the value that is above a first reference value Kc.

The control unit 60 determines that the amount of change K1 of the operating frequency is above the first reference value Kc after a certain time interval T, and decreases the output level of the heating coil L from "15" to "14."

The operation of the induction heating cooker during a second period (T1~T2) is as follows.

Referring to FIG. 5A, the temperature of the oil accommodated in the container C in the increase is seen as the container C is heated.

Since the control unit 60 changes the output level of the heating coil L from "15" to "14," the temperature of the oil is continuously increased at the increasing rate of the temperature 'd2' that corresponds to the output level at "14."

However, the value of the increasing rate of the temperature 'd2' is not fixed, but may be changed.

Referring to FIG. 5B, since the control unit 60 changes the output level of the heating coil L from "15" to "14," the control unit 60 sets the operating frequency at about 22 KHz 'f3' (refer to FIG. 5C) so that the output power of about 1800 W may be generated at t=T1'.

As a cooking operation is proceeded, that is, as time is proceeded, the temperature of the bottom surface of the container C is increased, and thus the magnetic field being generated at the heating coil L is weakened, and due to the above, the output level of the heating coil L is decreased.

However, the control unit 60 changes the operating frequency so that the output of the heating coil L may be maintained at a constant output level (here, at about "14").

For example, the control unit 60 may decrease the operating frequency as to increase the output of the heating coil L, and may increase the operating frequency as to decrease the output of the heating coil L.

As a result of the above, the output level of the heating coil L may be maintained at a constant value.

The temperature of the oil in the container C is continuously increased.

When the temperature of the oil is continuously increased, the temperature of the bottom of the container C is also continuously increased, and thus, while a certain time interval 'T' is being elapsed, the amount of change of the operating frequency is also continuously increased.

Referring to FIG. 5C, at t=T1', the operating frequency is about 22 KHz 13', and as time is passed, the operating frequency continues to be decreased.

At t=T2', the operating frequency is the value 'f4' that is decreased by a certain value 'K2' from 22 KHz.

The control unit 60 checks the operating frequency of the driving unit 50 at the time when the output level of the heating coil L is changed, that is, at t=T1', and also checks the operating frequency of the driving unit 50 that is varied as the temperature of the bottom surface of the container C is increased, at a certain time interval 'T'.

In addition, the control unit 60 calculates the amount of change 'K2' of the operating frequency of the driving unit 50 after a certain time interval 'T' from the point in time when the output level of the heating coils 'L' is changed, that is, at 't=T1'.

The amount of change 'K2' of the operating frequency is a value that corresponds to a difference between an initial operating frequency f3 corresponding to an output level at a present point of time and a varied operating frequency f4 upon elapse of a certain time period T after the change to the present output level.

The control unit 60 determines that the oil accommodated in the container is overheated in a case when the amount of change of the operating frequency at 't=T2' is above the predetermined first reference value.

The control unit 60, if determined that the oil accommodated in the container C is overheated, determines whether the present output level is the minimum output level, for example, in a case when an output level is about "1."

If the present output level is not the minimum output level, the control unit 60 decreases the output level of the heating coil L by one level by sending a control signal to the driving unit 50.

If the present output level is the minimum output level, the control unit 60 may stop the operation of the heating coil L by sending a control signal to the driving unit 50.

Referring to FIG. 5D, the amount of change of the operating frequency according to the passing of time is shown.

At 't=T1', the amount of change of the operating frequency is provided with a value that is near "0."

The above value is referred to as a value at the time when the control unit 60 changes the output level from "15" to "14."

Thus, in a case when the control unit 60 changes the output level of the heating coil L, since the operating frequency is set to have a value that corresponds to the changed output level, the amount of change of the operating frequency is provided with the value that is near "0."

However, as a cooking operation is operating, the temperature of the bottom surface of the container C is increased, and thus the magnetic field generated at the heating coil L is weakened, and because of the above, the output level of the heating coil L is decreased.

The control unit 60 continues to decrease the operating frequency as to compensate for the decreasing output level of the heating coil L.

As a result of the above, the amount of change of the operating frequency is increased as time is elapsed, and at t=T2', the amount of change 'K2' of the operating frequency is provided with a value that is above the first reference value 'Kc'.

The control unit 60 determines that the amount of change 'K2' of the operating frequency after a certain time interval 'T' is above the first reference value 'Kc', and decreases the output level of the heating coil L from "14" to "13."

The operation of the induction heating cooker during a third period (T2~T3) is as follows.

Referring to FIG. 5A, the temperature of the oil accommodated in the container C is seen as being maintained in a constant manner even in a case when the container C is heated.

Since the control unit 60 changes the output level of the heating coil L from "14" to "13," the heating coils L is heated at the output value that corresponds to the output level of "13."

Even through the control unit 60 heats the heating coil L at the output value corresponding to the output level of "13", the temperature of the oil is not changed.

The output level at which the temperature of the oil is not changed is not fixed to "13,", but may be changed.

Since the energy being supplied to the oil through the heating coil L and the energy being discharged to an outside form equilibrium, the temperature of the oil is maintained at a constant level.

Referring to FIG. 5B, since the control unit 60 changes the output level of the heating coil L from "14" to "13," the control unit 60 sets the operating frequency at about 23 KHz 'f5' (refer to FIG. 5C) so that the output power of about 1600 W may be generated at 't=T2'.

As a cooking operation is proceeded, that is, as time is proceeded, the temperature of the bottom surface of the container C is increased, and thus the magnetic field being generated at the heating coil L is weakened, and due to the above, the output level of the heating coil L is decreased.

However, the control unit 60 changes the operating frequency so that the output of the heating coil L may be maintained at a constant output level (here, at about "13").

For example, the control unit 60 may decrease the operating frequency as to increase the output of the heating coil L, and may increase the operating frequency as to decrease the output of the heating coil L.

As a result of the above, the output level of the heating coil L may be maintained at a constant value.

In a case when the output level of the heating coil L is at "13," the temperature of the oil in the container C is maintained at a constant level.

When the temperature of the oil is maintained at a constant level, the temperature of the bottom of the container C is also maintained at a constant level, and thus, while a certain time interval 'T' is being elapsed, the amount of change of the operating frequency is provided with a small value 'K3' (refer to FIG. 5C) that is near "0."

Referring to FIG. 5C, at 't=T2', the operating frequency is about 23 KHz 'f5', and as time is passed, the operating frequency is minutely decreased or maintained at a constant level.

At 't=T3', the operating frequency may be provided with a value 'f6' that is decreased by a certain value 'K3' from about 23 KHz.

The control unit 60 checks the operating frequency of the driving unit 50 at the time when the output level of the heating coil L is changed, that is, at t='T2', and checks the operating frequency of the driving unit 50 that is varied as the temperature of the bottom surface of the container 'C' is increased, at a certain time interval 'T'.

In addition, the control unit 60 calculates the amount of change 'K3' of the operating frequency of the driving unit 50 after a certain time interval 'T' from the point in time 'T2' when the output of the heating coils 'L' is changed.

The amount of change 'K3' of the operating frequency is a value that corresponds to a difference between an initial operating frequency "f5" corresponding to an output level at a present point of time and a varied operating frequency f6 upon elapse of a certain time period 'T' after a change to the present output level.

The control unit 60 determines that the oil accommodated in the container is not overheated in a case when the amount of change 'K3' of the operating frequency at 't=T3' is below the predetermined first reference value.

The control unit 60, if determined that the oil accommodated in the container 'C' is not overheated, maintains the output level of the heating coils L by sending a control signal to the driving unit 50.

Referring to FIG. 5D, the amount of change of the operating frequency according to the passing of time is shown.

At 't=T2', the amount of change of the operating frequency is provided with the value that is near "0."

The above value is referred to as the value at the time when the control unit 60 changes the output level from "14" to "13."

Thus, in a case when the control unit 60 changes the output level of the heating coil L, since the operating frequency is set to have a value that corresponds to the changed output level, the amount of change of the operating frequency is provided with the value that is near "0."

After the above, even in a case when a cooking operation is operating, since the temperature of the bottom surface of the container 'C' is maintained at a constant level, the decrease degree of the magnetic field being generated at the heating coils I' is also maintained at a constant level.

Thus, the output level of the heating coil L is minutely decreased or maintained at a constant level.

The control unit 60 minutely changes the operating frequency as to compensate for the value of the output level of the heating coil L.

As a result of the above, the amount of change of the operating frequency is maintained at a constant level even in a case when time is elapsed, and at 't=T3', the amount of change 'K3' of the operating frequency is provided with a value that is below than the first reference value 'Kc'.

The control unit 60 determines that the amount of change 'K3' of the operating frequency after a certain time interval 'T' is below the first reference value 'Kc', and continues to maintain the output level of the heating coil L at "13."

Figure 6:
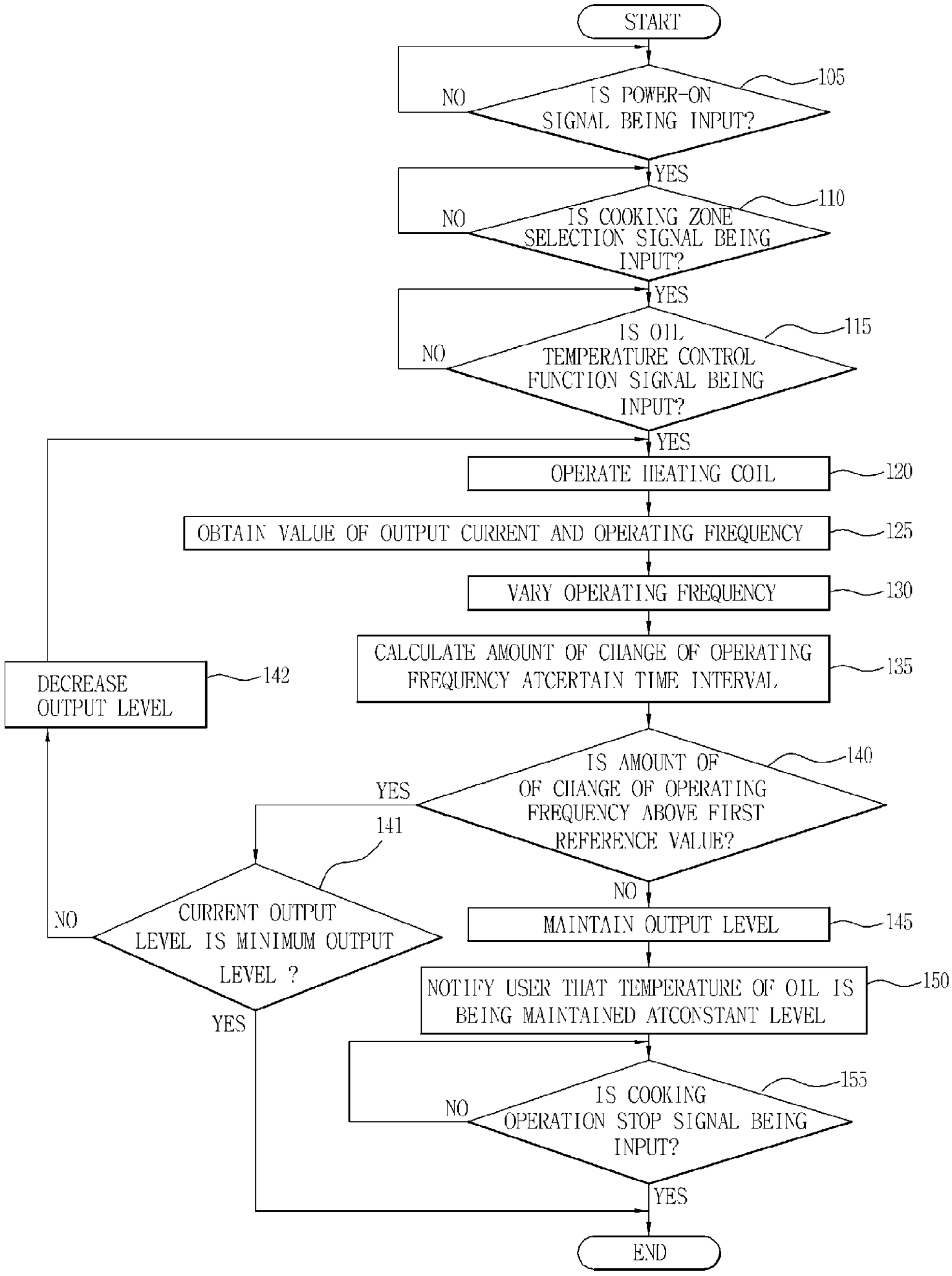
FIG. 6 is a flow chart illustrating a control method of an induction heating cooker in accordance with one embodiment.

FIG. 6 is a flow chart illustrating a method of controlling an induction heating cooker in accordance with one embodiment.

As an initial condition to provide descriptions on the operation of the embodiment, the memory (not shown) at an inside the control unit 60 is presupposed to be provided with the first reference value configured to determine whether the temperature of the oil accommodated in the container C is maintained at a constant level, as well as the certain time interval 'T' to check the operating frequency of the driving unit 50, is stored therein.

First, the main microcomputer 70 determines whether a power ON signal is being input through the manipulation of the ON/OFF button 81 by a user (105).

When the power ON signal is input through the manipulation of the ON/OFF button 81 by a user ('YES' from 105), the main microcomputer 70 turns on the power of the induction heating cooker and determines whether a cooking zone selection signal is being input through the manipulation of the cooking zone selection button 82 by a user (110).

When the cooking zone selection signal is input through the manipulation of the cooking zone selection button 82 by the user ('YES' from the 110), the main microcomputer 70 transmits the cooking zone selection signal to the control unit 60 configured to control the operation of the heating coil L, and determines whether an oil temperature control function signal is being input through the manipulation of the oil temperature controlling button 85 by a user (115).

When the oil temperature control function signal is input through the manipulation of the oil temperature controlling button 85 by a user ('YES' from the 115), the main microcomputer 70 transmits a command to perform an oil temperature control function to the control unit 60 configured to control the operation of the heating coil L.

The control unit 60 having received the command to perform an oil temperature control function sends a control signal to the driving unit 50 configured to control the operation of the heating coil L disposed at the corresponding position to the cooking zone 3 that is selected by the user to operate the corresponding heating coil L (120).

Next, the control unit 60 obtains the operating frequency of the driving unit by receiving the value of the current, that is, the value of the output current, which flows at the heating coil L from the detection unit 40 (125).

The control unit 60 determines, by using the value of the output current obtained, whether the output level of the heating coil L is decreasing, and while the oil in the container C is being heated, the control unit 60 varies the operating frequency of the driving unit 50 to maintain the output level of the heating coil L at a constant level (130).

For example, the control unit 60, when the output of the heating coil L is decreased as the container C is heated, may increase the output of the heating coils L by decreasing the operating frequency, so that the heating coil may be able to maintain an output, which corresponds to the output level, at a constant level.

Then, the control unit 60 calculates the amount of change of the operating frequency at a certain time interval 'T' from the point in time (t='0') when a cooking operation, that is, a heating of the oil, is started after the container C is placed on the cooking zone 3 (135).

Referring to FIG. 5C for the description of the above, the control unit 60 calculates the operating frequency 'f1' at the time when 't=0', and then calculates the operating frequency 'f2' at the time when 't=T1'.

Then, the control unit 60 calculates the amount of change 'K1' of the operating frequency, which is referred to as the value that corresponds to the difference between the operating frequency 'f1' at the time when 't=0', and the operating frequency 'f2' at the time when 't=T1'.

Next, the control unit 60 determines whether the amount of change of the calculated operating frequency is above a predetermined first reference value (140).

Here, the first reference value is referred to as the amount of change of the operating frequency, which serves as a reference in changing the output level of the heating coils, as the oil is overheated in temperature.

The first reference value may be determined by considering a value that corresponds to the amount of change of the operating frequency in a state when the temperature of the oil is no longer increased during a certain period of time.

If the amount of change of the calculated operating frequency is above the first reference value ('YES' from the 140), the control unit 60 determines that the oil accommodated in the container C is overheated.

Then, the control unit 60 determines whether an output level at the present point of time is a minimum output level, for example, in a case when the output level is at "1" (141).

The control unit 60, if determined that the present output level is not the minimum output level, sends a control signal to the driving unit 50 as to decrease the output level of the heating coil 'L' (142).

The control unit 60, in a case when the output level of the heating coil L corresponds to the minimum output level, may stop the operation of the heating coil L.

Meanwhile, if the amount of change of the calculated operating frequency is below the first reference value ('NO' from the 140), the control unit 60 determines that the oil is not overheated, and maintains the output level of the heating coil L by sending a control signal to the driving unit 50 (145).

Then, the control unit 60 transmits the result of a temperature control of the oil to the main microcomputer 70, and the main microcomputer 70 having received the result of the temperature control of the oil notifies a user through an alarm or a lamp that the temperature of the oil is being maintained at a constant state (150).

Next, the main microcomputer 70 determines whether a cooking operation stopping signal, that is, a power OFF signal, is being input through a manipulation of the ON/OFF button 81 by a user (155).

If the cooking operation stopping signal is input through the manipulation of the ON/OFF button 81 by the user ('YES' from the 155), the main microcomputer 70 turns OFF the power of the induction heating cooker, and ends the cooking operation.

As is apparent from the above description, the temperature status of oil can be directly detected by use of the correlation between the temperature status of the bottom of a cooking container and the amount of change of an operating frequency without having an intermediate medium.

In addition, the accuracy in detecting the temperature of oil, the decrease of the ignition risk of oil, and the maintenance or the control of the temperature of oil may be achieved.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An induction heating cooker, comprising:

a heating coil;

an inverter unit to supply high-frequency power to the heating coil;

a driving unit to provide a signal configured to control an operation of the inverter unit;

a detection unit to detect a value of a current that flows at the heating coil; and a control unit to calculate an operating frequency of the driving unit according to the value of the current, to vary the operating frequency so that the heating coil maintains a constant output that corresponds to an output level, and to determine whether oil accommodated in a container placed on the heating coil is overheated, by use of an amount of change of the operating frequency, wherein the control unit, in a case when the amount of change of the operating frequency is equal to or above a predetermined first reference value during a certain period of time, is configured to determine that the oil accommodated in the container is overheated.

2. The induction heating cooker of claim 1, wherein:

the amount of change of the operating frequency is a value that corresponds to a difference between an initial operating frequency corresponding to the output level and a varied operating frequency upon elapse of a certain time period after a change to the output level.

3. The induction heating cooker of claim 1, wherein:

the control unit, in a case when an output of the heating coil is below an output that corresponds to the output level, is configured to decrease the operating frequency of the driving unit such that the output of the heating coil is maintained at a same level of the output that corresponds to the output level.

4. The induction heating cooker of claim 1, wherein:

the control unit, in a case when the amount of change of the operating frequency is below a predetermined first reference value during a certain period of time, is configured to determine that the oil accommodated in the container is not overheated.

5. The induction heating cooker of claim 4, wherein:

the predetermined first reference value is a value that corresponds to the amount of change of the operating frequency, which serves as reference in changing the output level of the heating coil as the oil is overheated in temperature.

6. The induction heating cooker of claim 4, wherein:

the control unit is configured to send a control signal to the driving unit to maintain the output level of the heating coil if determined that the oil is not overheated.

7. The induction heating cooker of claim 1, wherein:

the control unit is configured to send a control signal to the driving unit to decrease the output level of the heating coil if determined that the oil is overheated.

8. The induction heating cooker of claim 1, wherein:

the control unit is configured to stop driving the heating coil in a case when the oil accommodated in the container is determined to be overheated while the output level of the heating coil corresponds to a minimum output level.

9. The induction heating cooker of claim 1, further comprising:

a manipulation unit having an oil temperature controlling button configured to select an oil temperature control function, wherein the control unit is configured to supply high-frequency power to the heating coil when an oil temperature control function selection signal is input by a manipulation of the oil temperature controlling button.

10. The induction heating cooker of claim 1, further comprising:

a display unit configured to display the output level of the heating coil and information on oil temperature.

11. A method of controlling an induction heating cooker having a heating coil, an inverter unit to supply high-frequency power to the heating coil, a driving unit to provide a signal configured to control an operation of the inverter unit, and a detection unit to detect a value of a current that flows at the heating coil, the method comprising:

detecting the value of the current that flows at the heating coil;

calculating an operating frequency of the driving unit according to the value of the current;

varying the operating frequency to maintain a constant output that corresponds to an output level;

calculating an amount of change of the operating frequency at certain time intervals; and determining whether oil, which is accommodated in a container that is placed on the heating coil, is overheated by use of the amount of change of the calculated operating frequency, wherein in the determining of whether oil is overheated, in a case when the amount of change of the operating frequency is equal to or above a predetermined first reference value during a certain period of time, the oil accommodated in the container is determined as being overheated.

12. The method of claim 11, wherein:

the amount of change of the operating frequency is a value that corresponds to a difference between an initial operating frequency corresponding to the output level and a varied operating frequency upon elapse of a certain time period after a change to the output level.

13. The method of claim 11, wherein:

in the varying of the operating frequency, in a case when an output of the heating coil is below an output that corresponds to the output level, the operating frequency of the driving unit is decreased to maintain an output of the heating coil at a same level of an output that corresponds to the output level.

14. The method of claim 11, wherein:

in the determining of whether oil is overheated, in a case when the amount of change of the operating frequency is below a predetermined first reference value during a certain period of time, the oil accommodated in the container is determined as not being overheated.

15. The method of claim 14, wherein:

the predetermined first reference value is a value that corresponds to the amount of change of the operating frequency, which serves as a reference in changing the output level of the heating coil as the oil is overheated in temperature.

16. The method of claim 14, further comprising:

maintaining the output level of the heating coil by sending a control signal to the driving unit, if determined that the oil is not overheated.

17. The method of claim 11, further comprising:

decreasing the output level of the heating coil by sending a control signal to the driving unit, if determined that the oil is overheated.

18. The method of claim 11, further comprising:

stopping the operation of the heating coil, in a case when the output level of the heating coil corresponds to a minimum output level.

19. The method of claim 11, further comprising:

supplying high-frequency power to the heating coil, when an oil temperature control function selection signal is input.

20. The method of claim 11, further comprising:

displaying the output level of the heating coil and information on oil temperature.

* * * * *